W. C. SNEYD.
VEHICLE TIRE.
APPLICATION FILED DEC. 30, 1912.
1,069,630. Patented Aug. 5, 1913.
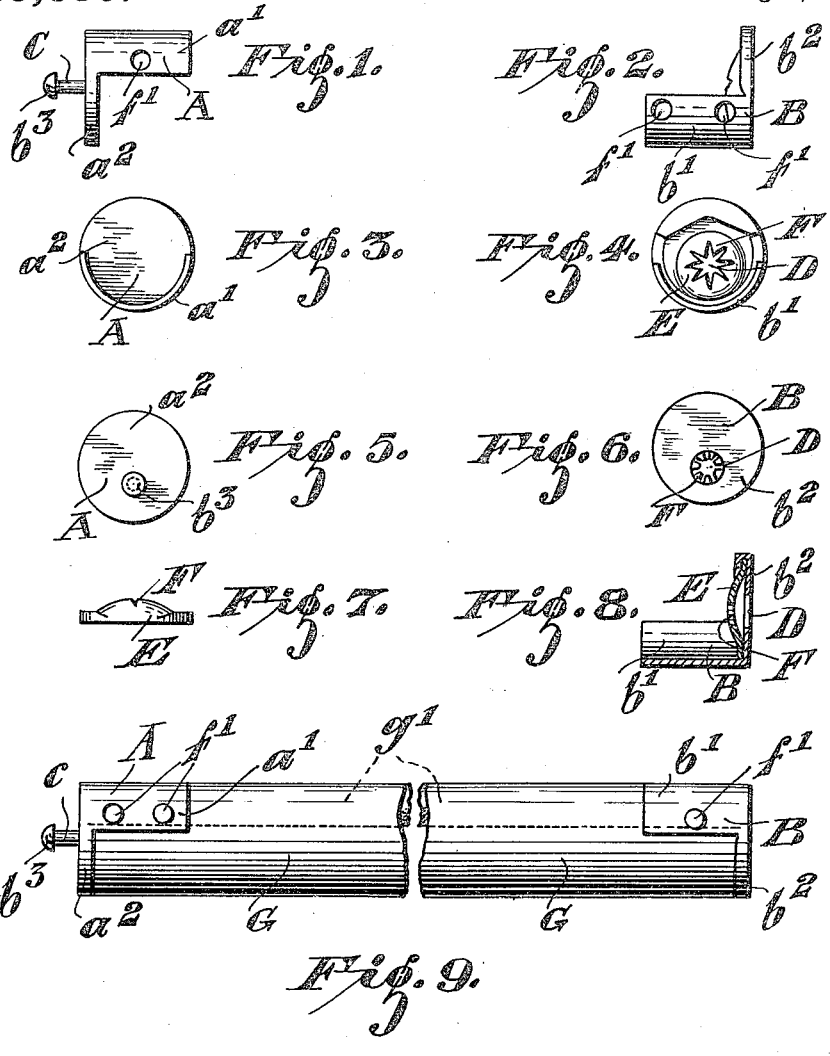

UNITED STATES PATENT OFFICE.

WILLIAM CORBETT SNEYD, OF SALE, ENGLAND.

VEHICLE-TIRE.

1,069,630.  Specification of Letters Patent.  Patented Aug. 5, 1913.

Application filed December 30, 1912. Serial No. 739,407.

*To all whom it may concern:*

Be it known that I, WILLIAM CORBETT SNEYD, a subject of the Kingdom of Great Britain, residing at 145a Northenden road, Sale, in the county of Cheshire, England, have invented certain new and useful Improvements in Vehicle-Tires, of which the following is a specification.

Hitherto there has been great difficulty in connecting the ends of solid elastic tires to last any length of time, and the object of my invention is to overcome this difficulty, and for this purpose according to the present invention a solid elastic tire is provided with a non-extensible material which is situated substantially at the inner surface of the tire throughout the whole of its circumference for the purpose of the more convenient attachment of a serrated or other form of clip for locking the two ends of the tire together.

In order that this invention may be clearly understood and readily carried into practice reference may be had to the appended explanatory sheet of drawings upon which:—

Figure 1 is a side elevation of one of the parts. Fig. 2 is a side elevation of another part. Fig. 3 is a rear end view of Fig. 1. Fig. 4 is an end elevation looking inside Fig. 2. Fig. 5 is a front view of Fig. 1. Fig. 6 is a front view of Fig. 2. Fig. 7 is an elevation of the piece that is fitted in Fig. 2 and also shown in Fig. 4. Fig. 8 is a sectional elevation of Fig. 2 showing how the part E in Fig. 7 is held in position. Fig. 9 is a piece of rubber showing the two ends with the parts attached to the non-extensible material ready for bending around to be locked. Fig. 10 is a similar view with the parts bent around and shown in position, locked ready for attaching to the rim of the wheel.

In a convenient embodiment of the present invention small pieces of metal A and B are provided as seen in Figs. 1 and 2, these are made with a half cylindrical portion $a$ and $b^1$ and a disk end $a^2$ and $b^2$ the diameter of which will depend upon the size of the tire they are required to fit. Each tire requiring two, one for each end, one of them shown in Fig. 1 being what I should call the male part having a stud like projection C formed on the front of the disk which also has a knob or projection $b^3$ formed on its end, Fig. 2 being what I should call the female part having a hole D into which the stud enters. Inside the female part a small disk E as seen in Fig. 7 is fixed as seen in Fig. 8, this is made of some springy or ductile material and is of a conical shape and split as seen in Fig. 4, so that when the stud C is forced through from the outside it forces open the points F which spring back and lodge behind the knob or projection $b^3$.

The mode of fixing is as follows:—The male part A is fitted on to one end of the tire G and held in position by small rivets or pins $f^1$ being driven into the non-extensible material $g^1$ there being two of these on one side and one on the other and it will be seen in Figs. 9 and 10 that the metal sheath portion is on the inside of the tire that is where the non-extensible material is positioned. As will be clearly apparent from the drawing, the member $g^1$ is not only non-extensible or non-stretchable, but is also flexible or pliable so that it may be bent in any direction, so that it adapts itself perfectly to the surface of the wheel and may also yield in case the tire is struck a sidelong blow by any inequality in the road surface. The female portion B is attached to the non-extensible material in a similar manner to the other end of the tire, the sheath portion also being underneath so as to lie snugly in the channel of the rim of the wheel. The tire is then bent around into its circular form, the knob $b^3$ being inserted or pushed through the hole D in the female part until it locks behind the split part E thus locking the two ends together as seen in Fig. 10.

I am aware that it has been proposed to form tires of a series of circular disks of leather, rubber or the like threaded upon a wire which wire forms an internal core situated in the center of the cross section of the tire, and the ends of which core have been socketed or connected together by an external screw bolt.

What I claim as my invention and desire to secure by Letters Patent is:—

A vehicle tire comprising in combination, an annulus of solid elastic material, a non-metallic, flexible, non-stretchable member arranged at the inner surface of said annulus and extending around the entire inner face thereof and attached thereto, said member and said annulus being divided at one point in the same radial line, and devices for attaching the extremities of said non-stretchable member together, said devices being provided with means whereby they may be connected one to the other and also disconnected at will, said non-stretchable member being entirely disconnected from the vehicle rim.

In witness whereof I have hereunto set my hand in the presence of two witnesses.

WILLIAM CORBETT SNEYD.

Witnesses:
ANNIE RHODES,
ROBERT BILLINGTON.

Copies of this patent may be obtained for five cents each, by addressing the "Commissioner of Patents, Washington, D. C."